United States Patent [19]

Kraushaar et al.

[11] Patent Number: 4,597,629
[45] Date of Patent: Jul. 1, 1986

[54] SOLAR BLIND ULTRAVIOLET FILTER

[75] Inventors: Robert J. Kraushaar, Tenafly, N.J.; Kevin B. Ward, Bayside, N.Y.

[73] Assignee: International Telephone and Telegraph Corporation, New York, N.Y.

[21] Appl. No.: 158,419

[22] Filed: Jun. 4, 1980

[51] Int. Cl.⁴ .............................................. G02B 5/24
[52] U.S. Cl. .................... 350/1.5; 350/316; 350/312; 350/1.6; 252/588; 252/582
[58] Field of Search ............ 350/311, 312, 316, 313; 252/588, 582

[56] References Cited

U.S. PATENT DOCUMENTS

| | | | |
|---|---|---|---|
| 2,128,110 | 8/1938 | Wilson | 350/312 |
| 3,801,179 | 4/1974 | Wisse et al. | 252/588 |
| 4,070,101 | 1/1978 | Richards et al. | 350/316 |

OTHER PUBLICATIONS

Winkel et al., "Pressure-Induced Fundamental Infrared Absorption Band of Gaseous Chlorine" *J. Chem. Phys.* 50(3), 1298-1302, (1969).

Sievers, "Far-Infrared Impurity Modes in Potassium Iodide" Chem. Abs., vol. 63 (1965) 5118d.
Braga et al., "A Band Pass Filter for the 2537 Å Mercury Line" J. Sci. Instr. (1966) vol. 43, pp. 341-342.

*Primary Examiner*—Teddy S. Gron
*Assistant Examiner*—Susan Wolffe
*Attorney, Agent, or Firm*—John T. O'Halloran; Mary C. Werner

[57] ABSTRACT

The solar blind ultraviolet filter includes in an intimate cascade relationship an ultraviolet grade quartz cell containing chlorine gas receiving light energy on an input face thereof, a first Jena UG5 glass cell containing potassium iodide doped with thallium, a second Jena UG5 glass cell containing a 2, 3-dihydro-5, 7-dimethyl-1H-1, 4-diazepine perchlorate and glycerol solution and a Jena UG5 glass and ultraviolet grade quartz cell containing nickel sulfate hexahydrate as the output element of the filter. A black anodized aluminum shell encloses the peripheral surface of all of the above cells. An extremely high viscosity interface coupling medium, such as dimethyl polysiloxane, is disposed at all interface surfaces of the various materials employed in the filter to minimize reflection losses at these interface surfaces.

15 Claims, 1 Drawing Figure

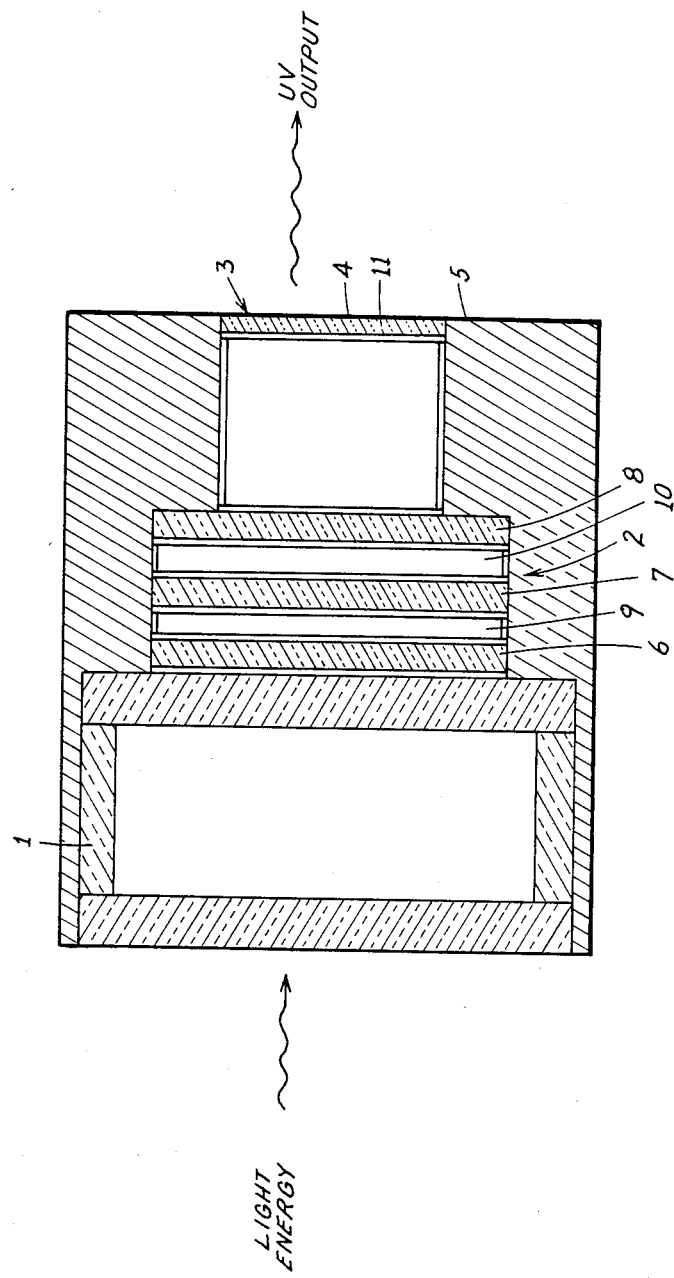

SOLAR BLIND ULTRAVIOLET FILTER

BACKGROUND OF THE INVENTION

The present invention relates to light filters and more particularly to a solar blind ultraviolet (UV) filter.

Solar blind UV filters provide a sharp attentuation in a short spectrum period to give a black background for the event being viewed and eventually detected and is employed to improve the performance of light detectors having unsuitable operating characteristics.

Solar blind UV filters in the prior art use a combination of doped glasses, crystals and thin films to achieve transmission in the 0.25 to 0.285 micron region. These prior art devices have low peak transmission in the band of interest and out-of-band light leaks which required the use of multilayer dielectric films to correct. The use of these films degraded the off axis performance of the filters.

SUMMARY OF THE INVENTION

An object of the present invention is to provide a solar blind UV filter which overcomes the disadvantages of the prior art solar blind UV filters.

Another object of the present invention is to provide a solar blind UV filter having increased transmission in the region of interest and a sharper defined band edge around 0.28 microns.

Still another object of the present invention is to provide an improved solar blind UV filter having increased transmission in the region of interest, a sharper defined band edge about 0.28 microns and which eliminates the previous light leak problems.

A feature of the present invention is the provision of a solar blind UV filter comprising: a cell containing a selected gas disposed coaxial of a longitudinal axis to receive light energy through an input face thereof; a filter element disposed coaxial of the axis and secured to an output face of the cell; a unit containing a crystal material disposed coaxial of the axis and secured to an output face of the filter element, the unit having an output face to provide an ultraviolet energy output for the solar blind filter; and a metallic shell disposed coaxial of the axis to enclose the peripheral surface of the cell, the element and the unit.

The solar blind UV filter disclosed herein uses some of the existing filter elements in combination with new elements to provide increased transmission in the region of interest, a sharper defined band edge about 0.28 microns and eliminates the previously described light leak problems.

BRIEF DESCRIPTION OF THE DRAWING

The above-mentioned and other features and objects of the present invention and the manner of obtaining them will become more apparent by reference to the following description taken in conjuction with the drawing, the single FIGURE of which is a longitudinal cross sectional view of a solar blind UV filter in accordance with the principles of the present invention.

DESCRIPTION OF THE PREFERRED EMBODIMENT

Referring to the FIGURE, the solar blind UV filter of the present invention is illustrated as including in an intimate cascade relationship, a UV grade quartz cell 1 containing chlorine gas at a pressure of 1.5 atmospheres having an input face to receive light energy, a filter element 2 secured to an output face of cell 1, and a unit 3 containing a nickel sulphate hexahydrate ($NiSO_4:6H_2O$) crystal. Chlorine gas is known to absorb light energy in the 3400 to 3800 Å region and the $NiSO_4:6H_2O$ crystal is known to absorb light energy in the 4500 to 6700 Å region. Unit 3 has an output face 4 to provide a UV energy output for the solar blind filter. Enclosing cell 1, element 2 and unit 3 on the peripheral surface thereof is a metallic shell 5, such as, a black anodized aluminum shell.

In the filter assembly, special precautions are taken to mask the cylindrical walls of cell 1, element 2 and unit 3 and, in particular, cell 1, so that a light pipe effect will not occur. If light piping did occur, solar radiation could bypass filter element 2 and result in an increased solar background count.

Filter element 2 includes a first glass disc 6, a second glass disc 7 spaced along the longitudinal axis from disc 6 and a third glass disc 8 spaced along the longitudinal axis from disc 7. A cavity 9 is formed between discs 6 and 7 and contains therein a filter material, preferably potassium iodide which is doped with thallium (KI:Tl) known to have a sharp cut off light energy filter characteristic in the 2790 to 3010 Å range, such as at 2968 Å. Between glass discs 7 and 8 there is formed a cavity 10 in which a filter fluid, preferably Cation X-glycerol solution, is confined. Cation X is obtainable from Eastman Kodak. Cation X has a concentration of 0.5 grams per liter of glycerol. Cation X is designated 2,3-dihydro-5,7-dimethyl-1H-1,4-diazepine perchlorate whose chemical formula is $C_7H_{13}ClN_2O_4$ and is known to absorb light energy in the 3000 to 3400 Å region. Cavities 9 and 10 are epoxy-sealed cavities and glass discs 6–8 are made from Jena UG5 glass known to absorb light energy in the 3600 to 4500 Å region. The Jena UG5 glass is made by and available from Jenaer Glaswerk Schott & Gen., Mainz, West Germany.

Unit 3 includes another epoxy-sealed cell containing the $NiSO_4:6H_2O$ crystal of 1 cm length. This cell includes the output face of disc 8 and a UV grade quartz disc 11 providing the output face 4 of the filter assembly.

In order to minimize the reflection losses at the various interface surfaces, such as the interface surface between cell 1 and disc 6, the interface surface between disc 6 and the thallium doped potassium iodide, the interface surface between the thallium doped potassium iodide and disc 7, the interface surface between disc 7 and the Cation X-glycerol solution, the interface surface between the Cation X-glycerol solution and disc 8, the interface surface between disc 8 and nickel sulphate hexahydrate crystal, and the interface between the crystal material and disc 11, a second fluid DC200, was introduced as an interface coupling medium. DC200 is dimethyl polysiloxane made by Dow Corning and is a stable polymer which has been found to be non-contaminating and non-adulterating in food processing. DC200 is a fluid of extremely high viscosity (300,000 centistrokes) and, therefore, does not require any special containment provisions except for shell 5.

While we have described above the principles of our invention in connection with specific apparatus, it is to be clearly understood that this description is made only by way of example and not as a limitation to the scope of our invention as set forth in the objects thereof and in the accompanying claims.

We claim:

1. A solar blind ultraviolet filter to pass ultraviolet light energy in a given passband and to block light energy outside of said given passband comprising:
   a first cell containing chlorine gas to absorb light energy in a first region spaced from said given passband disposed coaxial of a longitudinal axis to receive light energy through an input face thereof;
   a filter element including potassium iodide doped with thallium and a Cation X-glycerol solution to absorb light energy in a second region disposed between said given passband and said first region disposed along said axis and secured to an output face of said cell;
   a unit containing a nickel sulphate hexahydrate crystal to absorb light energy in a third region spaced from said given passband and adjacent the higher end of said first region disposed along said axis and secured to an output face of said filter element, said unit having an output face to provide an ultraviolet energy output in said given passband for said solar blind filter; and
   a black anodized aluminum shell disposed coaxial of said axis to enclose the peripheral surface of said first cell, said element and said unit.

2. A filter according to claim 1, wherein said first cell is formed from an ultraviolet grade quartz.

3. A filter according to claim 2, wherein said potassium iodide doped with thallium is disposed in a second cell and said Cation X-glycerol solution is disposed in a third cell in a cascade relationship with said second cell.

4. A filter according to claim 3, wherein
   said second cell is a first glass enclosure having an input face secured to said output face of said first cell, and
   said third cell is a second glass enclosure having an input face secured to an output face of said first enclosure.

5. A filter according to claim 4, wherein said first and second glass enclosures include
   a first glass disc secured to said output face of said first cell,
   a second glass disc spaced from said first glass disc, said potassium iodide doped with thallium being disposed between said first and second glass disc, and
   a third glass disc spaced from said second glass disc, said third glass disc providing said output face of said filter element, said said Cation X-glycerol solution being disposed between said second and third glass discs.

6. A filter according to claim 5, wherein
said first, second and third glass discs are Jena UG5 glass discs.

7. A filter according to claim 5, wherein
said unit includes
   said third glass disc, and
   an ultraviolet grade quartz disc spaced from said third glass disc, said quartz disc providing said output face for said unit, said crystal being disposed between said third glass disc and said quartz disc.

8. A fulter according to claim 1, wherein said potassium iodide doped with thallium is disposed in a second cell and said Cation X-glycerol solution is disposed in a third cell in a cascade relationship with said second cell.

9. A filter according to claim 8, wherein
   said second cell is a first glass enclosure having an input face secured to said output face of said first cell, and
   said third cell is a second glass enclosure having an input face secured to an output face of said first enclosure.

10. A filter according to claim 9, wherein
said first and second glass enclosures include
   a first glass disc secured to said output face of said first cell,
   a second glass fisc spaced from said first glass disc, said potassium iodide doped with thallium being disposed between said first and second glass disc, and
   a third glass disc spaced from said second glass disc, said third glass disc providing said output face of said filter element, said Cation X-glycerol solution being disposed between said second and third glass discs.

11. A filter according to claim 10, wherein
said first, second and third glass discs are Jena UG5 glass discs.

12. A filter according to claim 11, wherein
said unit includes
   said third glass disc, and
   an ultraviolet grade quartz disc spaced from said third glass disc, said quartz disc providing said output face for said unit, said crystal being disposed between said third glass disc and said quartz disc.

13. A filter according to claim 1, wherein
said unit includes
   a glass disc providing said output face of said filter element, and
   an ultraviolet grade quartz disc spaced from said glass disc, said quartz disc providing said output face for said unit, said crystal being disposed between said glass disc and said quartz disc.

14. A filter according to claim 13, wherein
said glass disc is a Jena UG5 glass disc.

15. A filter according to claims 1, 7, 12 or 14, further including
dimethyl polysiloxane disposed at all interface surfaces to minimize reflection losses at said surfaces.

* * * * *